(12) United States Patent
Jabara

(10) Patent No.: US 11,848,899 B2
(45) Date of Patent: Dec. 19, 2023

(54) ELECTRONIC READER AND METHOD OF OPERATION

(71) Applicant: Mobilitie, LLC, Newport Beach, CA (US)

(72) Inventor: Gary Bernard Jabara, Newport Beach, CA (US)

(73) Assignee: IP Investment Holdings, LLC, Costa Mesa, CA (US)

(*) Notice: Subject to any disclaimer, the term of this patent is extended or adjusted under 35 U.S.C. 154(b) by 155 days.

(21) Appl. No.: 15/816,627

(22) Filed: Nov. 17, 2017

(65) Prior Publication Data

US 2019/0158436 A1 May 23, 2019

(51) Int. Cl.
*H04L 51/04* (2022.01)
*G09G 3/20* (2006.01)
(Continued)

(52) U.S. Cl.
CPC .......... *H04L 51/04* (2013.01); *G06F 3/04817* (2013.01); *G06F 3/04886* (2013.01);
(Continued)

(58) Field of Classification Search
CPC ........ G06Q 20/32; G06Q 20/00; G06Q 20/10; G06Q 20/18; G06Q 20/382; G06Q 20/4014; G06Q 20/02; G06Q 20/342; G06Q 20/40; G06Q 20/401; G06Q 30/0225; G06Q 20/3674; G06Q 20/3823; G06Q 20/40145; G06Q 30/0201; G06Q 30/06;
(Continued)

(56) References Cited

U.S. PATENT DOCUMENTS 9,705,966 B1* 7/2017 Cherukuri ............ G06Q 10/101
2012/0047455 A1* 2/2012 Yuan .................... G06F 15/0291
715/781
(Continued)

OTHER PUBLICATIONS

International Search Report and Written Opinion in International Patent Application No. PCT/US2018/061335, dated Feb. 7, 2019, 8 pages.

*Primary Examiner* — Nelson M Rosario
*Assistant Examiner* — Scott D Au
(74) *Attorney, Agent, or Firm* — Davis Wright Tremaine LLP; Michael J. Donohue

(57) ABSTRACT

An electronic reader is implemented in a mobile computing device by downloading electronic reader computer instructions to be stored resident in the mobile computing device to permit the mobile computing device to be configured as a stand-alone electronic reader. One or more electronic books are downloaded and temporarily stored in a memory of the electronic reader. Chatroom functionality is integrated into the electronic reader to permit a user to communicate directly from an electronic book to a chatroom to thereby permit communication with selected parties. The user can communicate with other readers in the chatroom, with the author of the book, or with one or more subject matter experts designated by the author or publisher of the book. The integrated chatroom functionality combined with the stand-alone reader functionality provide a quality reading experience for the user as well as interactive capabilities.

26 Claims, 5 Drawing Sheets

(51) Int. Cl.
*G06F 3/04886* (2022.01)
*G06F 3/04817* (2022.01)
*H04W 76/10* (2018.01)
*H04L 51/52* (2022.01)

(52) U.S. Cl.
CPC ....... *G09G 3/2096* (2013.01); *G09G 2354/00* (2013.01); *G09G 2370/02* (2013.01); *G09G 2380/14* (2013.01); *H04L 51/52* (2022.05); *H04W 76/10* (2018.02)

(58) Field of Classification Search
CPC ........... G06Q 30/0601; G06Q 30/0613; G06Q 30/0631; G06Q 30/0641; G06Q 30/0185; G06Q 20/20; G06Q 20/204; G06Q 20/206; G06Q 20/227; G06Q 20/36; G06Q 20/3821; G06Q 20/405; G06Q 20/409; G06Q 40/00; H04L 51/04; H04L 51/046; G06F 21/32; G06F 21/33; G06F 21/83; G06F 2211/008; G06F 2221/2117; G06F 21/6218; G06F 21/86; G06F 2221/2143; G06F 15/16; G06F 21/00; G06F 21/64; G07C 9/00158; G07C 9/00166

See application file for complete search history.

(56) References Cited

U.S. PATENT DOCUMENTS

| | | | |
|---|---|---|---|
| 2012/0324393 A1* | 12/2012 | Mbenkum | G06Q 30/0201 715/776 |
| 2013/0254284 A1* | 9/2013 | Dougherty | G06F 21/00 709/204 |
| 2014/0196069 A1* | 7/2014 | Ahmed | H04N 21/4516 725/14 |
| 2016/0180248 A1 | 6/2016 | Regan | |
| 2017/0357501 A1* | 12/2017 | Ledet | G06F 8/33 |
| 2018/0349008 A1* | 12/2018 | Manzari | H04N 1/6027 |

* cited by examiner

ELECTRONIC READER AND METHOD OF OPERATION

BACKGROUND OF THE INVENTION

Field of the Invention

The present disclosure relates generally to electronic readers and, more specifically, to a system and method of operating an electronic reader to monitor reader activities and to facilitate direct communication between the reader and the author.

Description of the Related Art

There are a number of reader/author websites and software application programs currently in existence that offer millions, to over 1 billion (e.g., Goodreads), books that are available to subscribers/readers. Through a number of these application software programs (e.g., Kobo and Wattpad), subscribers/readers can highlight text in a book passage and add a note to a book passage, and these highlights and notes can be shared with friends, or other subscribers/readers. This sharing can also occur through posting on social media. These notes and passages can also be shared on social media sites. Some application software programs and web sites have forums, reviews, and blog posts for any book (e.g., ThirdScribe web site). These forums and blogs can also include author participation, so effectively, subscribers/readers can have some form of interaction with the authors, where a subscriber/reader can comment, and the author can reply at a later date.

It can be appreciated that there is a significant need for a new reader/author model that includes a tutorial in the application software program to help the reader and author understand how to navigate and use the application software program, that monitors user interaction with the application software program and provides a new interactive engagement model between the author and subscribers/readers. The present disclosure provides this, and other advantages, as will be apparent from the following detailed description and accompanying figures.

BRIEF DESCRIPTION OF THE SEVERAL VIEWS OF THE DRAWING(S)

DETAILED DESCRIPTION OF THE INVENTION

The proposed software application program (application software program), combined with an electronic book (electronic reader) permits a reader/author model, which has some key differences from available currently models, in terms of functionality, information, and interaction. A current model of reader/author interaction occurs only via the text created by the author and presented to the reader in the form of an electronic book. The prior art model has authors writing books, and readers reading books. There is no application software program or web site that allows a direct connection from the author to the reader in the form of a chatroom. The existing technology model permits indirect communication with the author through social media web sites, for example.

Figure 1:
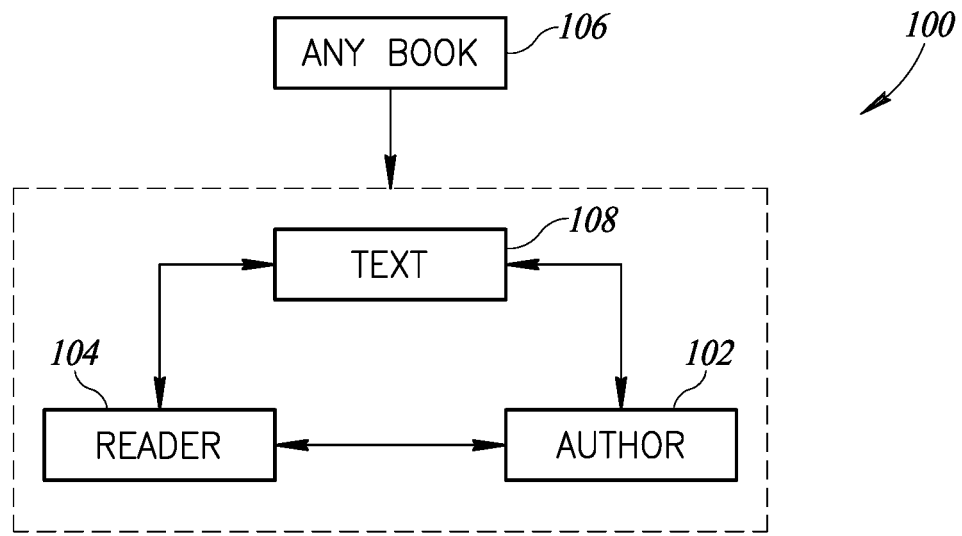
FIG. 1 illustrates a new model of interaction between readers and authors.

In contrast, the system described herein is self-contained with chatroom functionality integrated into the electronic reader system. Thus, the contact between the author and the reader is direct, as a result of the electronic reader system functionality. FIG. 1 shows a proposed new interactive engagement model 100 between an author 102 and subscribers/readers 104. The framework in FIG. 1 is modular. In other words, the framework concept can be applied to any book 106, and thus is generic. The proposed new model also provides the opportunity for a framework that can include the publisher of the book integrated into the framework. This allows the creation of a community within the context of the text 108 of the book 106 that is being read. The chatrooms allow interaction between readers, and between readers and the author. As part of the electronic reader system, in addition to the author, the reader can interact with subject matter experts, and guest authors invited by the author. For example, the subject matter expert can be a soccer coach if the book has been authored on the subject of soccer.

Figure 2:
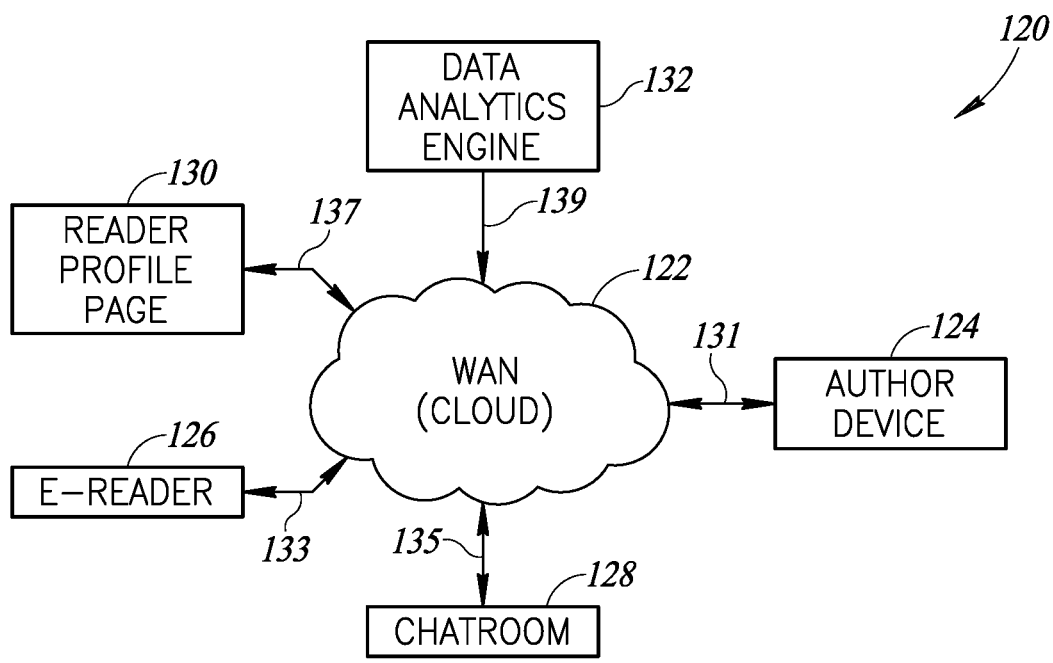
FIG. 2 illustrates a system architecture of new model of interaction between readers and authors.

FIG. 2 illustrates an exemplary embodiment of a system architecture to implement the new model of interaction illustrated in FIG. 1. A system 120 includes a wide area network (WAN) 122, which may be implemented with the Internet. The WAN 122 may also be considered a Cloud environment for purposes of data storage, data processing, and data exchange. FIG. 2 also illustrates an author computing device 124, an electronic reader 126, a chatroom 128, a reader profile page 130, and a data analytics engine 132. The author device 124 may be implemented as a personal computer, laptop, personal digital assistant (PDA), tablet, or smartphone. The author device 124 must permit the author to communicate with the WAN 122.

The electronic reader 126 is the focus of the present disclosure and will be discussed in greater detail below. The electronic reader 126 may be implemented using, by way of example, a computing device (e.g., desktop, laptop, tablet computing device), or smartphone. The chatroom 128 provides a forum for the exchange of ideas and commentary. Although the concept of a chatroom is not itself novel, the chatroom functionality of the present disclosure is integrated into the functionality of the electronic reader 126 to provide seamless navigation between the electronic book and the chatroom.

As will be described in greater detail below, the data analytics engine 132 collects data provided by the user as part of a user profile or automatically collected by the electronic reader 126. The data analytics engine 132 can analyze the collected data for individuals or groups of individuals and provide insights into reader habits and preferences. Such information can be used by authors to modify or create new electronic books. Data may also be provide to third parties for marketing purposes.

The chatroom 128, reader profile page 130 and data analytics engine 132 are typically hosted by a server or other computing device. The system 120 may be implemented with a single server providing support for the chatroom 128, reader profile page 130, and data analytics engine 132. Conversely, there may be separate servers for each of these functions or some combination of servers to provide the necessary functionality. For the sake of clarity, the chatroom 128, reader profile page 130, and data analytics engine 132 are shown as different elements in the system 120.

FIG. 2 includes a communication link 131 to permit the author device 124 to communicate with the WAN 122. Those skilled in the art will appreciate that the nature of the communication link depends on the type of interface available on the author device 124. Conventional interfaces, such as a cable modem, Ethernet connection, wireless connection, or the like, can be used to connect the author device 124 to the WAN 122.

Similarly, the electronic reader 126 is coupled to the WAN 122 via a communication link 133. The communication link 133 for the electronic reader 126 may be implemented in a fashion similar to those discussed above with respect to the communication link 131. The server or servers supporting the chatroom 128, reader profile page 130, and data analytics engine 132 are coupled to the WAN 122 via communication links 135-139, respectively. The communication links 135-139 may be readily implemented as a high speed Internet connection, or the like. The system 120 is not limited by the specific implementation of the communication links 131-139.

Some known electronic reader devices, such as the Kindle™ and Nook™ readers, are self-contained devices. While these devices permit Internet connectivity, it is typically to purchase and download a book. Other applications may include gameplay or other web-browsing activities. However, these stand-alone devices do not include Internet connectivity while reading an electronic book. Accordingly, these stand-alone devices do not feature an interactive chatroom as part of the reading experience.

Other known electronic readers are web-based devices. In these electronic readers, the software application program typically resides in a server connected to the Internet. As those skilled in the art can appreciate, web-based electronic readers may provide Internet connectivity while reading, but often result in a poor overall reading experience for the user due to the fluctuating quality of the Internet connection. Delays in response to user actions, such as turning a page, jumping to a selected page, marking text, and the like are often slow due to connectivity issues. As a result, web-based electronic readers may not provide the level of reader satisfaction as stand-alone electronic readers.

The electronic reader described herein is an integrated reader with the text reading software application program being resident in the device. Thus, the electronic reader of the present disclosure overcomes the deficiencies of the web-based electronic readers. Furthermore, as will be described in greater detail below, the electronic reader of the present invention provides integrated chatroom capability that is unavailable on other stand-alone electronic readers. Thus, the electronic reader of the present disclosure provides fast response to user activity, and also provides web-based chatroom functionality that permits the reader to interact with other readers, the author, or subject matter experts designated by the author.

Figure 3:
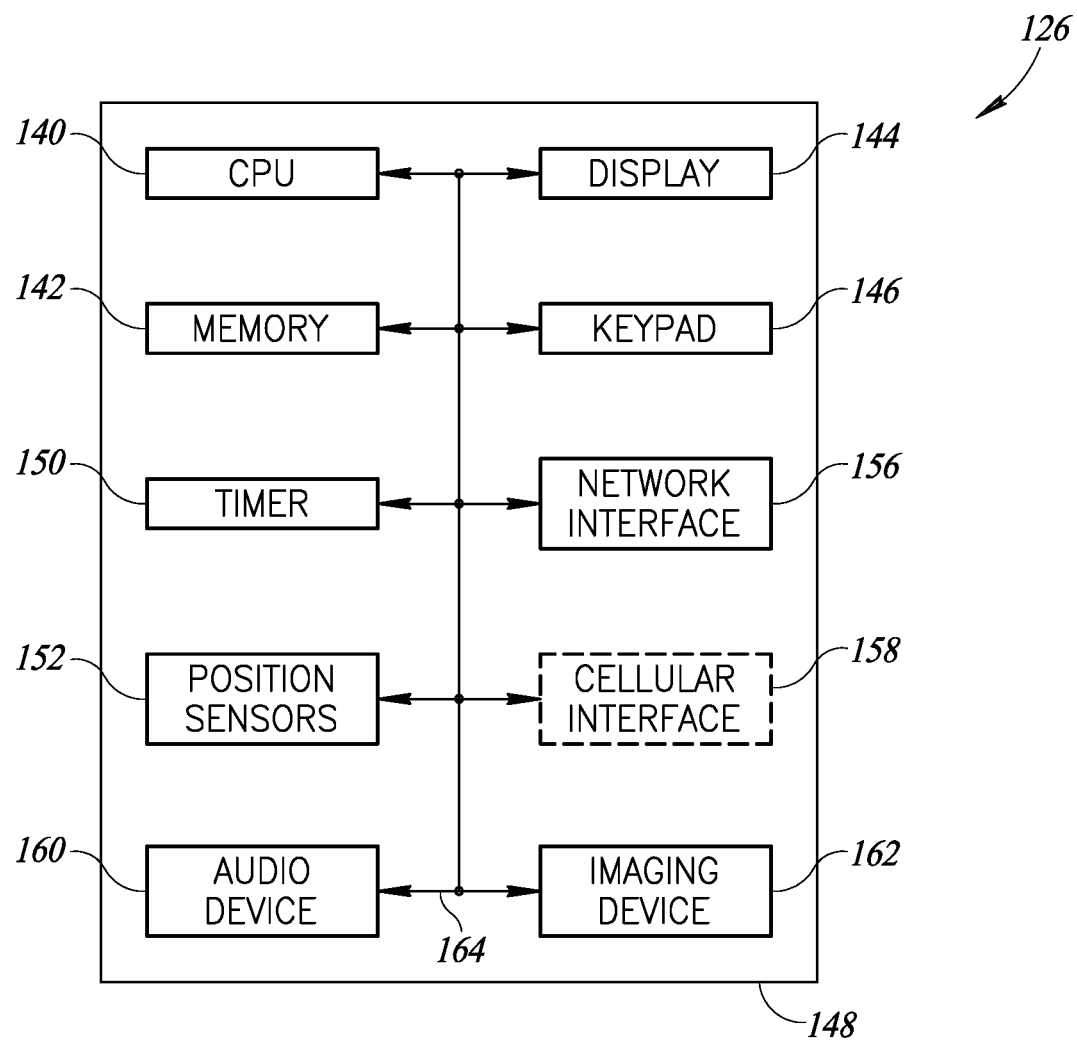
FIG. 3 is a functional block diagram of an electronic book constructed in accordance with the interaction model of FIG. 1.

FIG. 3 is a functional block diagram of the electronic reader 126. The electronic reader 126 includes a central processing unit (CPU) 140 and a memory 142. In general, the memory 142 includes instructions and data for execution by the CPU 140. The memory 142 may comprise read-only memory (ROM) and random access memory (RAM). In addition, the electronic reader 126 may include external storage in the form of a removable memory chip, such SD memory cards, that contain static RAM. All such devices may be considered to be part of the memory 142. In addition to instructions that implement the electronic reader software application program, the memory 142 stores the text data for one or more books. The text data for the books are downloaded from the WAN 122 (see FIG. 2) and stored in the memory 142.

The electronic reader 126 also includes a display 144 and keypad 146. The display 144 may be a black and white or color display optimized for text viewing. The keypad 146 provides a control mechanism for the user. In one embodiment, the display 144 is a touch-sensitive display and the keypad may be integrated as part of the display 144. Other controls, such as a "Home" or "Reset" button may be separate from the touch-sensitive display 144. Additional controls, such as a brightness, volume control, power, and the like may be part of the keypad 146 or be separate control buttons attached to a housing 148 that contains the various components of the electronic reader 126. In an alternative embodiment, the keypad 146 may comprise a separate keypad area with some or all of the controls described above.

The electronic reader 126 may also include a timer 150 and one or more position sensors 152. As will be discussed in greater detail below, the timer 150 may be used to track reader habits, such as the total length of time that a reader reads in one session, the number of pages read during that time period, the length of time required to read each page, the time of time of day at which a book is read and the length of time for each time of day in which the book is read. Various other temporal measurements may also be used to characterize the readers habits. Those skilled in the art will appreciate that the timer 150 may be included in the CPU 140 or may be implemented as a set of instructions stored in the memory 142 and executed by the CPU 140.

The position sensors 152 may be used to detect when the reader picks up the electronic reader 126 and may determine the orientation of the housing 148 to thereby rotate the display of text on the display 144. For example, the user may orient the housing 148 such that the display 144 is in a "portrait" mode with a rectangular display having a shorter width than the length of the display. If the user rotates the housing 148 such that the display 144 is oriented in a "landscape" mode, the width of the display is greater than the length of the display. The text in the display 144 may also be rotated to accommodate the orientation of the housing 148.

The electronic reader 126 also includes a network interface 156. In an exemplary embodiment, the network interface may include a connector (not shown) coupled to the housing 148 to attach an interface cable to thereby provide network connectivity. This may also provide external power to recharge internal batteries (not shown) of the electronic reader 126. This hardwired configuration of the network interface 156 may be implemented as a number of different conventional interfaces such as a Universal Serial Bus (USB), FireWire, or the like. The electronic reader 126 disclosed herein is intended to operate with any conventional hardwired interface. In addition, the network interface 156 may implement a wireless connection to a network access point (not shown) to establish connectivity with the WAN 122 (see FIG. 2). Again, the wireless version of the network interface 156 may be implemented using known technologies, such as Bluetooth, Zigbee, or the like. In an exemplary embodiment, the wireless network interface 156 may be implemented using IEEE 802.11, typically referred to as WiFi. The wireless network interface 156 connects with an access point, such as a WiFi access point in the home, workplace, or available in many public locations, such as airports, train stations, restaurants, coffee shops, and the like.

In yet another exemplary embodiment, the electronic reader 126 may include a cellular interface 158. If the electronic reader 126 is implemented in a smartphone, it typically includes a cellular interface, such as the cellular interface 158, as well as wired and wireless network interfaces 156. Many tablet computer devices include the network interfaces 156 (wired and wireless) as well as the cellular interface 158. When it is possible to access the WAN 122 using the hardwired or wireless network interface 156, the electronic reader can establish interconnectivity using the network interface. However, in areas where hardwired network access or wireless access points are not available, the cellular interface 158 may provide connectivity to the WAN 122 via a conventional cellular telephone network (not shown). Various known cellular technologies are available to implement the cellular interface 158.

The electronic reader 126 may also include conventional devices, such as an audio device 160 and one or more imaging devices 162. The audio device 160 may include both input and output devices in the form of a microphone and speakers, respectively. These are conventional components in smartphones and other portable computing devices. The imaging device 162 may include one or more cameras capable of taking photographs or generating a video signal. Many smartphones include a forward facing and a rearward facing imaging device 162 within the housing 148. The imaging device(s) 162 are also conventional components in a smartphone or other portable computing device. The imaging device 162 may be used to generate images or video clips related to the activities of the user.

The various components described above are coupled together by a bus system 164. The bus system 164 may include an address bus, data bus, control bus, power bus, and the like. For the sake of convenience, those various buses are illustrated in FIG. 3 as the bus system 164.

One example of the software application program is known as the Complete Athlete, which includes a variety of electronic books on various sports, such as soccer, basketball, baseball, and the like. The application software program includes a tutorial to help the reader and author understand how to navigate and use the application software program. Additionally, a single application software program can incorporate a book store, or book shelf. A book shelf can include all of the books that are available for purchase within the application software program. These books can be associated with a particular subject, such as sports, or the book topics can be general. The books could be self-published by the application software program parent company, or can be connected with other publishing companies. A book store may include additional electronic book selections that can be purchased using conventional techniques outside the application software.

Resultantly, one of the main attributes that the new application software program provides is a connection between the reader and the author. The application software program engages the author/reader interaction directly in real time using the chatroom 128 (see FIG. 2). The application software program allows a reader the ability to contact the author directly, and engage in real-time interaction. Each reader can go into the chatroom 128 associated with a particular author, or a particular book. The chatroom 128 will also include other friends and readers of that author, and allow the subscriber/reader to have a direct connection to the author. The electronic reader 126 can also provide thoughts and opinions on the book(s) directly to the author, who can review and comment on the thoughts and opinions within the application software program.

The reader can also connect with other readers of a given book through the chatroom 128. The common interest between readers is obviously the book and the author. Questions can be infused into the book text at strategic locations to create reader-to-reader engagement. In addition, notifications to the reader can be included in the chatroom 128. The chatroom 128 can be tied to the table of contents, to permit entry to the chatroom of a given chapter, for example. The chatroom 128 can be part of the text for each chapter. The reader can click on the author, the subject matter expert, or the guest author icon to connect to the associated chatroom 128 for that particular passage or chapter.

Figure 5:
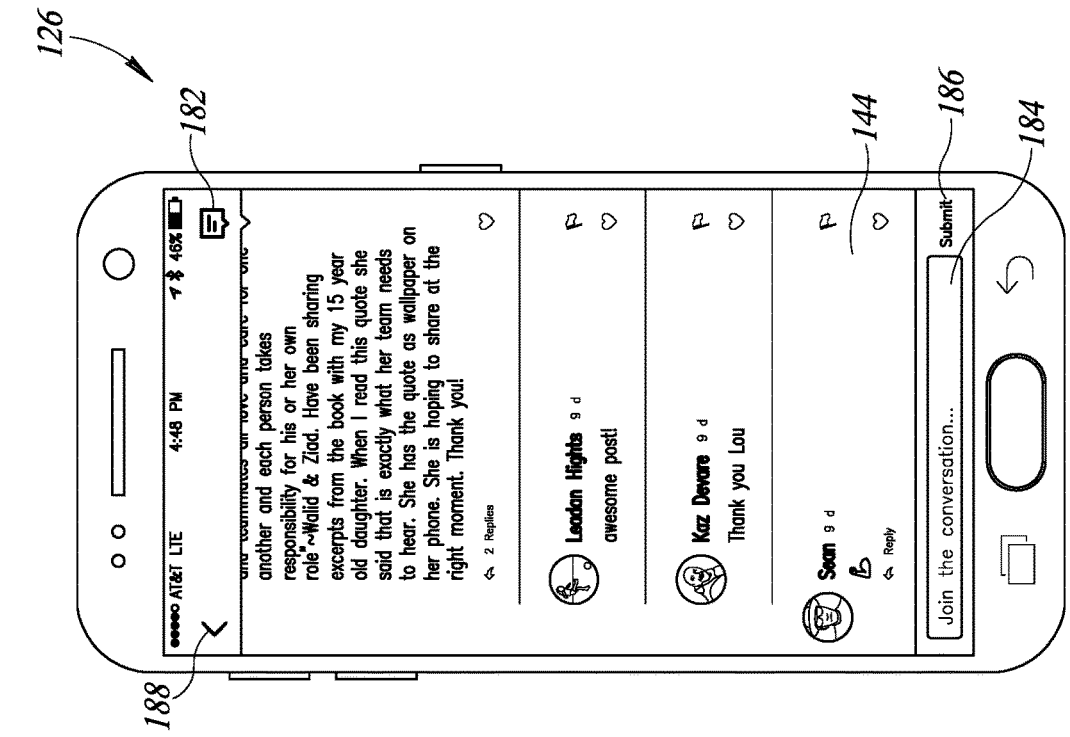
FIG. 5 is the display of FIG. 4 upon activation of a control mechanism on the display to navigate to a chatroom.
Figure 4:
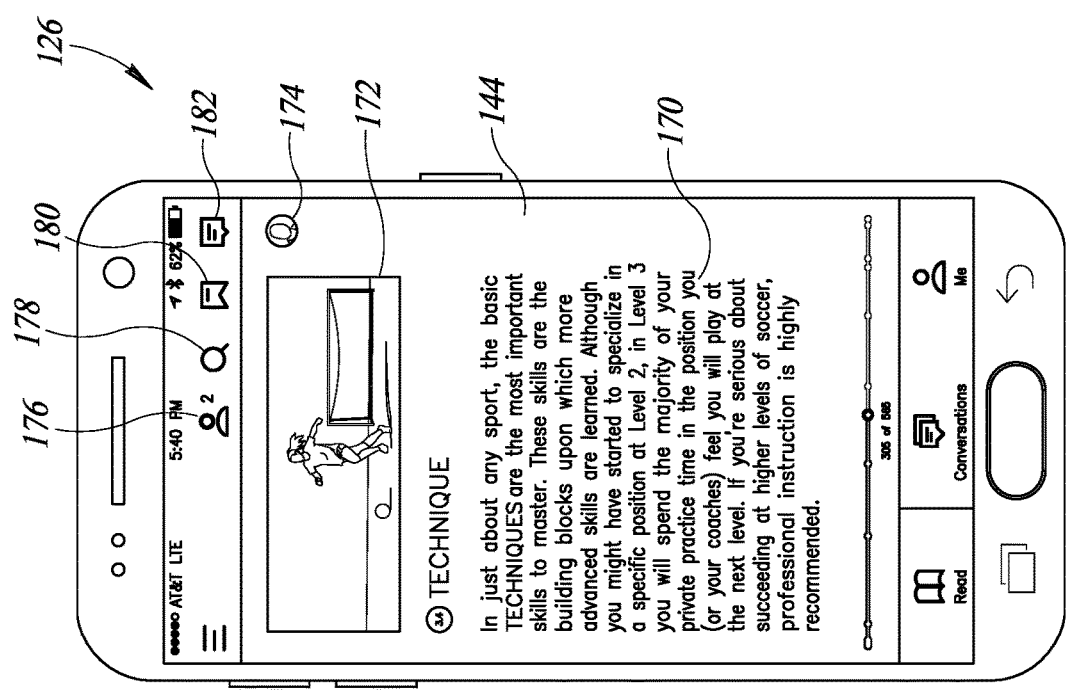
FIG. 4 illustrates the display of an exemplary embodiment of the electronic reader to illustrate the display of electronic book data and control mechanisms.

FIGS. 4 and 5 illustrate an example of the electronic reader 126 implemented in a smartphone. In FIG. 4, the display 144 illustrates a portion of an electronic book on soccer. In addition to text data 170, the electronic book may contain image data 172 in the form of diagrams, illustrations, photographs, video images, and the like. In general, the image data 172 corresponds to the text data 170 shown on the display 144 of the electronic reader 126.

In addition, FIG. 4 illustrates a number of control icons available to the reader. A contributor icon 174 is illustrated in the form of a small image of the author or subject matter expert as applicable. For example, the subject matter expert may be a coach. The reader can tap on the icon 174 to open the chatroom 128 associated with the coach and/or the discussion associated with the currently displayed text data 170 or the currently displayed image data 172. The icon 176 indicates the number of readers currently reading the particular book. A search icon 178 allows the reader to search for a specific text or topics. A bookmark icon allows the user to mark one or more user-selected sections of the electronic book for future reference. A discussion icon 182 provides a simple and direct way for the reader to navigate to a chatroom associated with the particular book. User activation of the discussion icon 182 will automatically take the reader to the chatroom listing all discussions associated with the entire electronic book. This integrated operation means that the user does not have to open a separate software program, such as a web browser, to navigate to the chatroom.

FIG. 5 illustrates the data shown on the display 144 of the electronic book 126 in response to activation of the discussion icon 182 in FIG. 4. The user can join the conversation by tapping on a text box 184 that will cause a keyboard to be shown on the display 144. The user may type a text message in a conventional fashion and submit the text by tapping on a submit button 186. The reader can readily return to the text by tapping a return button 188 on the display 144. Thus, the integrated chatroom functionality of the electronic reader 126 permits the user to readily navigate back and forth between the text of the book and the chatroom 128.

In addition to text messaging, the electronic reader 126 permits the use of audio and/or video messaging. For example, in the context of a Complete Athlete soccer book, it is possible to include a short video clip by the author or subject-matter expert to demonstrate a particular technique. Similarly, a reader can post audio/video clips to the chatroom to demonstrate a particular technique or to request coaching with a particular technique.

There can be prompts to the reader within the electronic book, in strategic locations in the book, to enter the chatroom 128 and discuss the passage that was just read. As an example, there can be prompts at the beginning and end of each chapter. For example, questions can be asked at the end of the chapter to provide more information regarding a reader's interests, or it can be a question to gamify the book. Gamification is a process that turns some activity into a game of sorts to more completely engage the reader. For gamification, the question would be related to the chapter that was just read, and the question would be continued to be asked, until the reader correctly answered the question, and would be allowed to continue on to the next chapter. Those skilled in the art can appreciate that a single book can include a variety of approaches to more completely engage the reader. Various questions, prompts, and the like, can be placed in strategic or even arbitrary locations throughout the book. There can also be a private version of the chatroom 128 that allow the author to communicate with each reader privately, or allow each reader to communicate with other readers privately. Each reader will be able to see how many other readers are reading the book simultaneously, in real time. Important passages can be highlighted, and there can be prompts, in the form of icons or other known methods, to allow the reader to enter the chatroom 128 at these passages, in order to make comments. All of these features allow the reader and author to have relationships with the text. Depending on the state of the book being read, the author may utilize the chatroom comments to help influence and formulate future characters, future topics, future chapters, sub-chapters, and the ending to the book.

Another key attribute of this application software program within the electronic reader 126 is the data generated by the data analytics engine 132 (see FIG. 2) and provided to the author, the publisher, and other possible partners, based on their readership and based on the subscribers in the application software program. In one embodiment, data is generated for each reader of each book. Alternatively, data can be aggregated over a larger number of readers and categorized. For example, data from readers of a soccer book can be aggregated by age groups, sex, years of playing experience, etc.

As noted above, the electronic reader 126 includes the timer 150 and one or more position sensors 152. The position sensors 152 can detect changes in the orientation of the electronic reader 126 to thereby determine that the reader has picked up the book. In addition to controlling the display of electronic book data, the CPU 140, executes instructions in the memory 142, to track the user's progress as each page of the book is turned. The timer 150 can be used to determine data such as length of time that the reader spends on each page, the total length of time that the reader is reading the book at any particular session, time of day, and the like.

Examples of the type of data automatically collected include, but are not limited to:
1. How often does the reader read?
2. What book(s) did they read?
3. How many pages did the reader read at a time?
4. How long did it take to read those pages?
5. How long did they spend on each page?
6. Did the reader get through the entire book?
7. If they made it through the book, how long did it take?
8. How many pages did they read in a sitting?
9. How many times did they pick up and put down the book?
10. What times of the day did they read, and how many pages did they read each time?
11. Did the reader stop at some point and not continue? How deep into the book did the reader go?
12. What pages of the book did the reader highlight and or make notes?
13. What passages or chapters did readers like or dislike?
14. Did the reader read any passages twice?
15. What are some of the reader's habits?

Other information can be provided by the reader or, if the reader is a juvenile, the information may be provided by the reader's parents. In addition to the chatroom 128 (see FIG. 2), the system 120 provides the reader profile page 130 for each registered reader. In a manner similar to registration on other social media websites, the reader profile page 130 can provide information about the reader, such as name (or user name), hobbies, interests, favorites (e.g., sports teams, sports heroes, sports, movies, hobbies, and other interests). In addition to information provided by the reader via the reader profile page 130, a sports book can ask for additional information about the reader.

As a specific example of the framework, a sports book can be authored, and the following questions can be asked, and the data would be of interest to a sports merchandising company. The key consideration is the infusion of these questions strategically in the text, in order to keep the reader engaged, as well as being willing to provide the following information:
1. Who are the readers (age, location, personal preferences)?
2. What are their ages?
3. What sports do they play?
4. What are their favorite sports clothes?
5. What level of sports do their kids play?
6. What organizations are their kids involved with?
7. What are their shoe sizes?
8. Why is the reader reading the book?
9. Who are the reader's favorite characters?
10. What are some of the reader's likes and preferences regarding the book?
11. Who are the reader's kids?
12. What suggestions does the reader have for the author for future books or for a different ending to the current book?

This type of information will be collected, in addition to any and all possible statistics of interest to the author, the publishing company, or a corporate entity, such as a sports merchandising company. For example, the generation of these statistics for the reader base can be supplied to the author for each book that has been authored. Based on the number of readers available, this represents a very large data base of insightful information for the author relative to their readership. This information can be utilized by the author for future writing efforts to get an idea of what their readers want to see, and can theoretically impact the writing style of the author. This collected data, and associated data analytics, is also compelling for the author's publisher as well. The questions can also be a source of reader-to-reader interaction as well, to provide a community where information is shared amongst readership with the same interests. The data analytics will also be valuable to third parties that can provide advertising and merchandising to the readership.

Yet another key attribute of this application software program is the ability to gamify the application software program. As discussed above, gamification may serve to increase the readers engagement with the book. In one example of gamification, the readers can get points/credits for a number of activities. There can be levels/grades, etc. for the readers within the context of the application software program. There can be statistics generated based on the data. There can be questions asked related to the previous chapter just completed by the reader. There can be a number of possible participation engagements, with associated leader boards, and prizes/gifts for the most active subscribers/readers that participate. The total number of books read, for example, is one consideration. The application of gamification in the context of reading books, to engage the reader more in the overall reading experience, is not provided by conventional electronic books. The gamification can be utilized by a content management system (CMS), as well as by third parties, to provide targeted marketing to the readership of a particular book, for example. The CMS, which may be part of the data analytics engine 132 (see FIG. 2), can be used to capture all of the automatically generated user utilization data as well as all of the reader-provided data. The CMS will use to the analytical data to create charts that will be useful to the author, internal analysis, and third party entities. The operation of the data analytics engine 132 to generate such statistics, charts, correlations, etc. is well known in the art and need not be described in greater detail herein.

The application software program can include profiles for the author, subject matter experts, and readers. As will be described in greater detail below, the profiles are part of a industry-centric social network. Readers can use the social network to connect with other readers having similar backgrounds or interests. The author and subject-matter expert profiles can be used as promotional tools by those individuals. These profiles can describe the career specific information for that individual in a specific industry. The interactive model above can be applied to this specific industry, such as sports. This platform can be a social media platform for that specific industry, similar to other known social media platforms for business. Thus, one person can connect with another in non-business related activities. One example of this interaction would be a given sport, such as football, baseball, basketball, or soccer. However, in the context of the Complete Athlete, the network is defined as a social sports network rather than a business network. The reader will include sports interests, sports background, their children's sports, their sports apparel for themselves and their children, etc. The participation of the author as part of the forum provides a unique experience for the reader not included in any other electronic book reader forums. An additional feature will be in-application software program notifications to the reader when the author of a book, that has been purchased by the reader, has commented in the chatroom. Thus, the author is part of the social experience of the readers.

Another possible dimension to the electronic book framework is to incorporate audio books as well. This permits the reader to move seamlessly from listening to a book in the car, while driving, to continuing with the electronic book, in the application software program, where they left off with the audio book in the car. This would provide an additional feature for the reader. Additionally, an enhancement to the application software program will allow integration of the application software program into existing formats such as Kindle, Nook, and iBooks. As of an example of this integration, the iBooks application software program can incorporate an SDK memory card (not shown) that translates the iBooks format into the framework described above, which would increase the reader/author interaction.

The Complete Athlete application software program is sports-centric, and focuses on sports books and a sports social network. The application software program is downloaded, and books are acquired through In-application software program purchases. Each book on the book shelf focuses on a different sport, but the focus is strictly sports.

A second application software program, similar in operation to the Complete Athlete, is called Social Worm. Social Worm does not have the sports-oriented profile functionality of the Complete Athlete application software program, as described above. Instead, the Social Worm is a social book club where individuals can purchase virtually any electronic books book and exchange views on the book. The system 120 (see FIG. 2) can include a Social Worm web site and a Social Worm profile in addition to the reader profile page 130, which is part of the Complete Athlete social sports network. The Social Worm website is associated with the second application software program to permit the purchase of general electronic books.

In one embodiment, the Social Worm software application program can be obtained from the application software program store associated with the user device, and used to experience/read the electronic book purchased in the application software program store. Alternatively, the Social Worm books can be purchased via the software application program installed on the electronic reader 126, as described above with respect to the Complete Athlete. For example, the Social Worm can organize books by genre and permit the reader to select a genre. Selection of a particular genre will then open up a new organizational level that can display book selection by title, author, and the like. The reader can continue to make selections to narrow the scope of the search and thereby provide a list of available books.

In operation, the Social Worm is similar to the Complete Athlete. For example, the author or subject matter expert can initiate conversations in an integrated chatroom and permit readers to ask or answer questions, provide insights or other commentary relevant to the topic initiated by the author or subject matter expert. If the author is deceased, a publisher may designate a subject matter expert. For example, a college professor or literary scholar may be designated as a subject matter expert for classic works (e.g., War and Peace, Shakespeare plays, etc.). The role of the author or subject matter expert is to provide guidance to the readers to thereby enhance understanding and enjoyment of the books.

The Social Worm social profile also operates in a manner similar to that discussed above with respect to the Complete Athlete. A reader and Social Worm member can create a profile (typically non-sports centric) that lists hobbies and interests of the reader. Other Social Worm readers can search profiles and send email or chatroom messages directly to other Social Worm readers.

Thus, a general electronic book can be purchased, and the Social Worm social book club experience (the forums, communication in the chatroom with the author and other readers, etc.) will be included in the unique experience. Effectively, this is a book club within an electronic book, a social platform, contained within an electronic book, and a robust social electronic reader.

Figure 6:
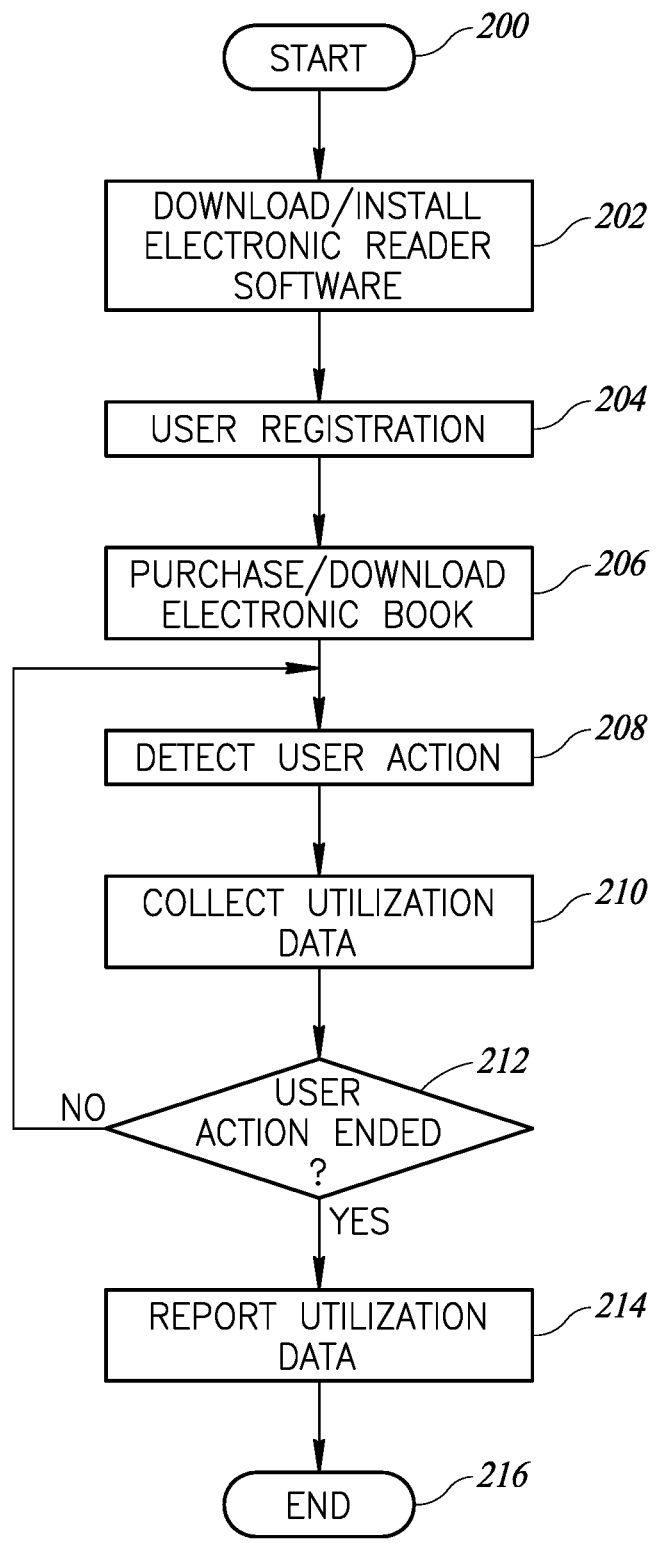
FIG. 6 is a flow chart illustrating the overall operation of the electronic reader, including registration and the election of utilization data.
Figure 7:
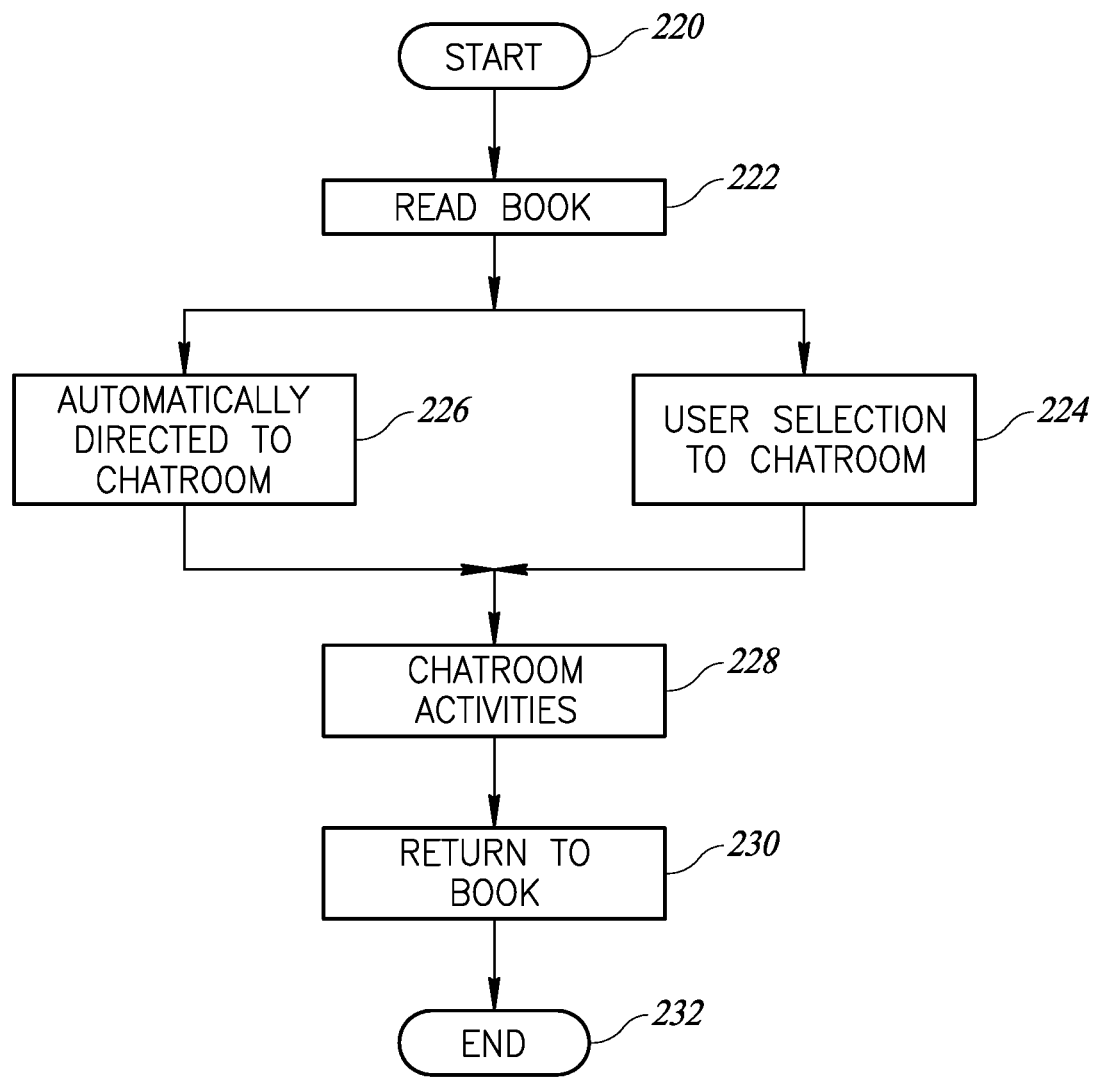
FIG. 7 is a flow chart, taken in conjunction with the flow chart of FIG. 6, to illustrate the operation of the integrated chatroom while reading an electronic book.

An example of operation of the electronic reader 126 is illustrated in the flow charts of FIGS. 6 and 7. In FIG. 6, at a start 200, the user is assumed to have a computing device compatible with operation with the system 120 (see FIG. 2). In step 202, the user can download and install the electronic reader software. In one embodiment, the reader software may be downloaded without charge. In other examples, there may be a small charge to purchase and download the software. Those skilled in the art will appreciate that the software may be downloaded from an "APP Store" in a conventional manner. Step 202 also includes installation of the downloaded electronic reader software on the electronic reader 126.

In step 204, the user performs a registration process. As discussed above, the registration can include the creation of a reader profile page where the reader can identify a user name, hobbies, interests, and the like, as are known with other social media platforms. The user may also optionally include a photograph or avatar to identify the user.

In step 206, the user purchases and downloads an electronic book. In the example embodiment described herein, the user may purchase a Complete Athlete electronic book from within the Complete Athlete software application program. As previously discussed, the downloaded electronic book is stored in the memory 142 (see FIG. 3) of the electronic reader 126.

In step 208, the electronic reader automatically detects user action. For example, the electronic reader can detect user activation of the electronic reader software or opening of the downloaded electronic book.

In step 210, the electronic reader 126 collects user utilization data. As described above, the electronic reader 126 includes a timer 150 and position sensors 152. These devices can be used to collect utilization data, as described above, such as length of time for a single reading session, length of time for each page, total number of pages read, time of day, and the like.

In decision 212, the electronic book 126 determines whether the user action has ended. That is, the electronic reader 126 determines whether the user has terminated the current reading session. If the user has not terminated the current reading session, the result of decision 212 is NO and, the process returns to steps 208-210 to continue detecting user action and collecting utilization data.

If the user action has ended, the result of decision 212 is YES. In that event, in step 214, the electronic book 126 reports utilization data to the data analytics engine 132 (see FIG. 2) and the process ends at 216.

Those skilled in the art will appreciate that a number of variations in the flow chart of FIG. 6 are possible. For example, user registration need not occur prior to any reading of the book. Indeed, a user can read an entire electronic book without registration. Conversely, registration can occur at the initial reading, during the middle of the book, or at convenient time selected by the user. However, chatroom functionality and social profiles are not available to an unregistered user. Similarly, the report of utilization data in step 214 need not occur only at the end of user action (i.e., the result of decision 212 is YES). Utilization data can be reported periodically during the reading of the book, or saved and reported periodically, such as end of the day, end of the week, end of a chapter, or the like.

As discussed above, the electronic reader 126 advantageously permits operation with an interactive chatroom 128. FIG. 7 is a flow chart illustrating the interactive chatroom operation. Although illustrated as a separate flow chart, the operation described with respect to FIG. 7 occurs while the reader is reading the electronic book. This means that the steps in the flow chart of FIG. 7 may be typically implemented as part of a process that includes steps 208-210 in FIG. 6.

At a start 220, the electronic reader has detected user action (i.e., step 208 in FIG. 6). In step 222, the reader is reading the electronic book. In step 224, the electronic book 126 detects user selection of chatroom functionality. Alternatively, the electronic book may automatically direct a user to the chatroom in step 226. As discussed above, such activity may occur, by way of way of example, at the end of a chapter, or after a particular passage in the electronic book. Whether the user arrives at the chatroom 128 as a result of user selection of the chatroom (i.e., step 224) or is automatically directed to the chatroom (i.e., step 226), in step 228, the user engages in chatroom activities.

Those skilled in the art will appreciate that conventional chatroom activities can include a single user posting commentary or two or more users posting commentary or engaging in a conversation. However, in the case of the electronic book 126, the in-book chatroom activities must be initiated by the author or designated subject-matter expert. This limitation serves to focus the chatroom conversations more narrowly on the subject matter of the particular electronic book (e.g., a soccer book).

The system 120 provides for reader-to-reader messaging in the form of public or private messaging via the user profile pages 130 (see FIG. 2). This form of messaging can be initiated by any registered user and need not be initiated by the author. However messaging via the user profile pages 130 may also include exchanges between the reader and the author of the electronic book.

In step 230, the user returns to the electronic book and the process ends at 232. As described above, the user may activate the return button 188 (see FIG. 5) or be automatically returned to the book following the completion of any questions, such as at the end of a chapter.

Thus, the electronic book described herein provides the advantages of a stand-alone reader, without relying on network connectivity for conventional reading activities. However, the electronic reader 126 also includes integrated chatroom functionality that permits the reader to move directly and seamlessly between the electronic book and the chatroom 128 (see FIG. 2).

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. An electronic-reader device comprising:
   a housing;
   a processor;
   a memory configured to store electronic book data for a first electronic book and to store reader computer instructions for execution by the processor to control display of the electronic book data, the reader computer instructions being stored resident in the memory;
   a keypad, operable by a user, to control operation of the electronic-reader device;
   a display to display the electronic book data under the control of the resident reader computer instructions;
   a network interface configured to connect the electronic reader to a wide-area network (WAN); and
   a bus system configured to electrically couple the processor, memory, keypad, display, and network interface;
   wherein the electronic reader device is configured to display a portion of the stored electronic book data to thereby display a text of the first electronic book stored electronically in the memory, the text being displayed under the control of the resident reader computer instructions;
   the resident reader computer instructions further causing the display to display a chatroom integrated with a part of text for each chapter of the first electronic book to thereby permit the user of the electronic-reader device to communicate directly with an author of the first electronic book.

2. The electronic-reader device of claim 1 wherein the user of the electronic-reader device can further use the in-book chatroom associated with the first electronic book to communicate directly with the subject-matter expert.

3. The electronic-reader device of claim 1 wherein the network interface is configured for hardwired operation to interconnect the electronic-reader device to the WAN via a cable connectable to the electronic-reader device.

4. The electronic-reader device of claim 1 for use with a wireless access point wherein the network interface is configured for wireless operation to interconnect the electronic-reader device to the WAN via a wireless connection between the wireless access point and the electronic-reader device.

5. The electronic-reader device of claim 1 for use with a cellular network wherein the cellular network is configured for gateway access to wireless operation to interconnect the electronic-reader device to the WAN, the electronic-reader device further comprising a cellular interface configured to establish a wireless connection between the electronic-reader device and the cellular network to hereby establish a communication link with the WAN via the cellular network.

6. The electronic-reader device of claim 1, further comprising a position sensor coupled to the housing and configured to determine an orientation of the housing in a portrait mode or a landscape mode, the electronic-reader device rotating the display of the text of the first electronic book based on the housing orientation.

7. The electronic-reader device of claim 1 wherein the display is a touch-sensitive display, operable by the user, and the keypad is implemented as part of the touch-sensitive display to control operation of the electronic-reader device.

8. The electronic-reader device of claim 1 wherein the resident reader computer instructions cause the processor to monitor user operation of the electronic-reader device, user operation including at least one of a list of operations comprising duration of a reading session, frequency of reading sessions, number of pages read per reading session, length of time reading the number of pages read per session, length of time reading a selected page, and repeat reading of previously read pages.

9. The electronic-reader device of claim 1 wherein user operation of the keypad causes the electronic-reader device to navigate to the chatroom for chatroom communication with the other readers of the first electronic book while still reading the first electronic book.

10. The electronic-reader device of claim 1 wherein the display is a touch-sensitive display, operable by the user, and the display includes a chatroom icon that when activated by the user, automatically causes the electronic-reader device to navigate to the chatroom for chatroom communication with the other readers of the first electronic book.

11. The electronic-reader device of claim 1 wherein the single activation of the first key on the keypad is a user activity in response to reading a specific portion of the first electronic book and the chatroom to which the user is switched is a chatroom associated with the specific portion of the first electronic book.

12. The electronic-reader device of claim 1 wherein the electronic reader device is further configured to display a number of readers simultaneously reading the first electronic book, in real time.

13. The electronic-reader device of claim 1 wherein the chatroom is configured to receive at least one of audio messages or video messages.

14. A system for chatroom communication between a plurality of readers comprising:
   a plurality of electronic-reader devices, each having:
      a housing;
      a processor;
      a memory configured to store electronic book data for a first electronic book locally in each of electronic-reader devices to eliminate delays in transferring electronic book data from a remote server in a web-based reader, and to store reader computer instructions for execution by the respective processor to control display of the electronic book data, the reader computer instructions being stored resident in the memory;

a keypad, operable by a respective user, to control operation of the respective electronic-reader device;

a display to display the electronic book data under the control of the resident reader computer instructions; and a network interface configured to connect the electronic reader to a wide-area network (WAN);

wherein the electronic-reader device is configured to display a portion of the stored electronic book data to thereby display a text of the first electronic book stored electronically in the memory, the text being displayed under the control of the resident reader computer instructions;

the resident reader computer instructions further causing the display to display a chatroom integrated with a part of text for each chapter of the first electronic book to thereby permit the user of each respective electronic-reader device to communicate directly within the first electronic book with an author of the first electronic book or a subject-matter expert of the first electronic book, and thereby avoid indirect communication with the author required by posting comments to a remote server in a web-based reader, wherein a chatroom conversation in the chatroom integrated with the part of text for each chapter must be initiated by the author or subject-matter expert, and wherein the user of each respective electronic-reader device cannot engage in the chatroom conversation unless the chatroom conversation in the chatroom integrated with the part of text for each chapter has been initiated by the author or subject-matter expert.

15. The electronic-reader devices of claim 14 wherein the respective displays are touch-sensitive displays, operable by the respective user, and each display includes the first key on the keypad as a chatroom icon that when activated by the user, automatically causes the respective electronic-reader device to navigate to the chatroom for chatroom communication with the other readers of the first electronic book and the second key on the keypad is a return icon that, when activated by the user, automatically causes the respective electronic-reader device to navigate from the chatroom back to the first electronic book.

16. The electronic-reader devices of claim 14 wherein the respective users of the electronic-reader devices can further use the chatroom associated with the first electronic book to communicate directly with the subject-matter expert.

17. The electronic-reader device of claim 14 wherein the single activation of the first key on the keypad by each user is in response to reading a specific portion of the first electronic book and the chatroom to which each user is switched is a chatroom associated with the specific portion of the first electronic book.

18. A non-transitory computer-readable medium containing computer instructions and data that, if executed by a processor in an electronic reader (E-reader), cause the processor to:

store electronic book data for a selected electronic book;

store resident reader computer instructions for execution by the processor to control display of the selected electronic book data on an electronic display for viewing by a user;

sense operation of a keypad by a user;

control operation of the electronic reader based on the user operation of the keypad;

control operation of a display to display the selected electronic book data; and control operation of a network interface to permit communication with a wide-area network (WAN);

wherein the E-reader is configured to display a portion of the stored electronic book data to thereby display a text of the selected electronic book, the text being displayed under the control of the resident reader computer instructions;

the resident reader computer instructions further causing the E-reader to display a chatroom integrated with a part of text for each chapter of the selected electronic book to thereby permit the user of each respective electronic-reader device to communicate directly within the selected electronic book with an author of the selected electronic book or a subject-matter expert of the selected electronic book.

19. The computer-readable medium of claim 18 wherein resident reader computer instructions further permit the user of the electronic-reader device to use the chatroom associated with the electronic book to communicate directly with a subject-matter expert following the initiation of the chatroom conversation.

20. The computer-readable medium of claim 18 wherein the resident reader computer instructions cause the processor to monitor user operation of the E-reader, user operation including at least one of a list of operations comprising duration of a reading session, frequency of reading sessions, number of pages read per reading session, length of time reading the number of pages read per session, length of time reading a selected page, and repeat reading of previously read pages.

21. The computer-readable medium of claim 18 wherein user operation of the keypad causes the E-reader to navigate to the chatroom for chatroom communication with the other readers of the electronic book while still reading the electronic book.

22. The computer-readable medium of claim 18 wherein the display is a touch-sensitive display, operable by the user, and the display includes a chatroom icon that when activated by the user, automatically causes the E-reader to navigate to the chatroom for chatroom communication with the other readers of the electronic book.

23. The computer-readable medium of claim 18 wherein the network interface is configured for hardwired operation to interconnect the E-reader to the WAN via a cable connectable to the electronic-reader device.

24. The computer-readable medium of claim 18 for use with a wireless access point wherein the network interface is configured for wireless operation to interconnect the E-reader to the WAN via a wireless connection between the wireless access point and the electronic-reader device.

25. The computer-readable medium of claim 18 for use with a cellular network wherein the cellular network is configured for gateway access to wireless operation to interconnect the E-reader to the WAN, the E-reader further comprising a cellular interface configured to establish a wireless connection between the electronic-reader device and the cellular network to hereby establish a communication link with the WAN via the cellular network.

26. The computer-readable medium of claim 18 wherein sensing the single activation of the first key on the keypad is in response to the user reading a specific portion of the selected electronic book and the chatroom to which the electronic reader is switched is a chatroom associated with the specific portion of the selected electronic book.

\* \* \* \* \*